June 24, 1969
J. B. GODIN
3,452,113
EXTRACTION OF ISOBUTYLENE BY POLYMERIZATION
Filed Feb. 27, 1967
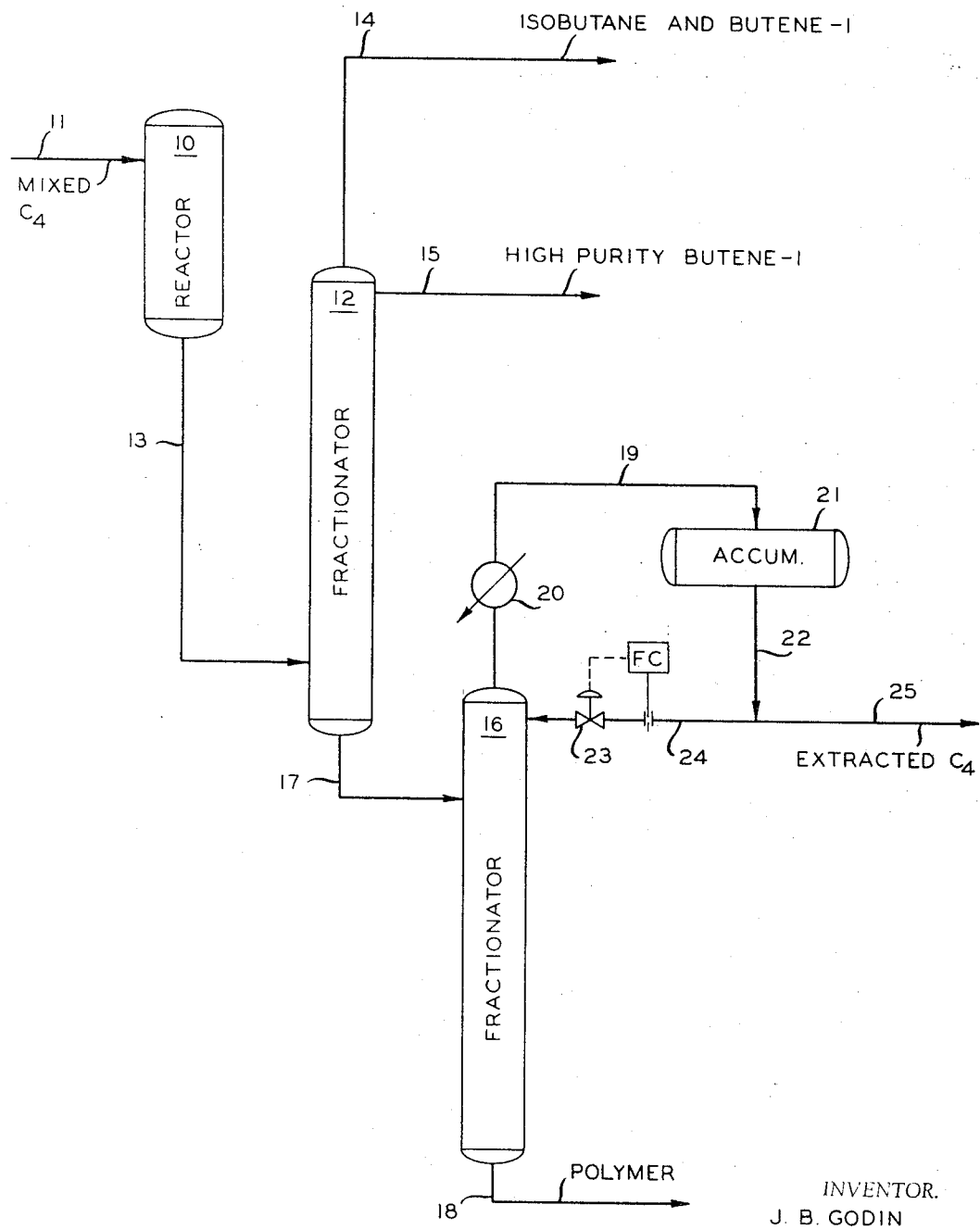
INVENTOR.
J. B. GODIN
BY Young + Quigg
ATTORNEYS

United States Patent Office

3,452,113
Patented June 24, 1969

3,452,113
EXTRACTION OF ISOBUTYLENE BY POLYMERIZATION
James B. Godin, Borger, Tex., assignor to Phillips Petroleum Company, a corporation of Delaware
Filed Feb. 27, 1967, Ser. No. 618,575
Int. Cl. C07c 7/04; C08f 1/94, 1/64
U.S. Cl. 260—677                      6 Claims

ABSTRACT OF THE DISCLOSURE

Isobutylene is removed from hydrocarbon streams by polymerizing the isobutylene over a silica gel catalyst, at temperatures under 150° F. and pressures ranging from 100–900 p.s.i.a.

---

This invention relates to a method for extraction of olefins from hydrocarbon streams. In another aspect, this invention relates to the selective extraction of isobutylene from a mixed liquid $C_4$ stream.

The demand for high purity hydrocarbons has become increasingly important in the chemical industry. The removal of isobutylene from high purity butene-1 streams is of particular importance, and very difficult to accomplish. Separation by fractionation is not effective since the boiling points of the two components lie in a very narrow range. In the past a method has been employed for effecting such separation by selective absorption and polymerization of the isobutylene in sulfuric acid. However, such method of operation involves the use of large volumes of acid, extensive equipment, and high operating cost. Also, it is known that isobutylene can be selectively polymerized from a vaporous $C_4$ stream by utilizing various solid catalysts. This polymerization occurs at very high temperatures and pressures. Therefore, this method is very expensive because a large quantity of fuel is required to maintain the $C_4$ stream in the vaporous state. Therefore, there is needed a simple and efficient way to remove isobutylene from a liquid $C_4$ stream under relatively low conditions of temperature and pressure.

The object of this invention is to provide a method of selectively removing isobutylene from liquid $C_4$ streams under conditions of low temperatures and pressures.

According to one embodiment of this invention isobutylene is removed from a liquid $C_4$ stream by contacting the said stream with a silica gel catalyst at a temperature under 150° F. and preferably from 90–125° F. and more preferably from 90–100° F., and the pressure from 100–900 p.s.i.a., preferably from 100–200 p.s.i.a., said said contact causing the isobutylene within the said stream to polymerize. The silica gel catalyst is promoted by the incorporation of an oxide of a metal selected from Groups III–A and IV–B of the Periodic Table as illustrated on page B2 of the handbook of Chemistry and Physics published by the Chemical Rubber Company, 45th edition (1964).

According to another embodiment of this invention isobutylene is polymerized according to the first embodiment in a butene-1 rich $C_4$ stream and the resulting stream is then fractionated to recover substantially pure butene-1.

The preparation of the silica gelled catalyst is not part of this invention. However, a method of preparing the same is included in the interest of clarity.

In general, these catalysts are prepared by first forming a hydrous silica gel or jelly from an alkali-silicate and an acid, washing soluble material from the gel, treating or activating the gel with an aqueous solution of a suitable metal salt, and subsequently washing and drying the treated material. In this manner, a part of the metal, presumably in the form of a hydrous oxide or loose hydroxide compound formed by hydrolysis, is selectively absorbed by the hydrous silica, and is not removed by subsequent washing. This selective adsorption is attested by a decrease in the metal content of the activating solution as well as a decrease in pH as the activation progresses. The most often used catalyst of this type, at present, is a silica-alumina catalyst, prepared by treating a wet or partially dried hydrous silica gel with an aluminum salt solution, such as a solution of aluminum chloride or sulfate, and subsequently washing and drying the treated material. However, catalysts of a very similar nature but differing among themselves as to one or more specific properties, may be prepared by using, instead of an aluminum salt, a hydrolyzable salt of a metal selected from Group III–A or from Group IV–B of the Periodic System, and may be referred to in general as "silica-alumina type" catalysts. More particularly, salts of indium and thallium in addition to aluminum in Group III–A may be used, and salts of titanium and zirconium in Group IV–B may be used to treat silica gel and to prepare catalysts of this general type. Boron in the form of boric acid, or a soluble borate such as sodium borate, may be incorporated with silica gel. Whether prepared by this method or by some modification thereof, the catalyst will contain a major portion of silica and a minor portion of metal oxide.

In the above-outlined procedure, the starting materials are usually chosen from the water-soluble silicates and the commercially available mineral acids. Sulfuric and hydrochloric acids are preferred on economic grounds, although any acid may be used which will provide suitable hydrogen ion concentration and form a silica hydrogel of proper consistency. Thus, phosphoric, acetic, nitric, and boric acids may be used in certain instances. The gel formed should be acidic and should be partially dried and washed free of excess acid prior to activation, and the extent of drying is carefully controlled since the eventual catalyst activity is apparently somewhat dependent on the maintenance of the hydrous oxide composition prior to the activation treatment. The salt solution for activation may be prepared from any water-soluble hydrolyzable salt of one or more of the metals indicated, with the sulfate or chloride being preferred. Other alternate salts include acetates and nitrates. The adsorption of the anhydrous oxide by the silica gel proceeds smoothly with hydrated silica gel, whereas with dried silica the absorption and the activation may be much less satisfactory. Active catalysts are preferably rinsed free of the salt solution and a moderate concentration effect or "curing" may be obtained by partial drying of the rinsed gel. The final washing then serves to remove unadsorbed salts and free acid, and the final drying which is performed at moderate temperatures produces hard, brittle granules of gel containing negligible quantities of compounds other than silica and the metal oxide.

Modifications may be made in the foregoing procedure and catalysts of suitable activity may result. One obvious alternative is the addition of the metal salt to the silica before gelation. This method enables the incorporation of greater proportions of metal oxide, but activity may not be proportional to increasing metal oxide contents above about 1 to about 15 weight percent so that little is gained by the modification and the proper degree of salt and acid removal may be more difficult. Non-uniform materials usually result from the mechanical mixing of hydrous metal oxide and silica gels, so that catalysts prepared in this manner may be less satisfactory. Other means of accomplishing the preparation may be devised, however, in view of the foregoing description.

As indicated above, the finished gel-type catalysts comprise essentially silica and metal oxide, with variant quantities of water. The metal oxide may be present in minor activating quantities of about 1 to about 15 weight percent of the total oxides. In many instances, catalytic activity may be as great with about 1 to 5 percent of metal oxide as with about 10 to 15 percent. Still greater amounts up to about 50 weight percent may be added if desired, although the physical characteristics and activity of the catalyst may be adversely affected. In order to retain the selectivity of the catalyst for the present reaction, other heavy metal oxides than these hereinbefore recited, or salts are usually absent from the starting materials and the finished gel.

The activity of the catalysts prepared by this method is usually enhanced in the present process by a mild dehydration treatment at temperatures of about 200 to about 300° F. just prior to introduction of the hydrocarbon feed. The dehydration is usually accomplished by passing a stream of an inert hydrocarbon or other gas through the catalyst bed at the designated low temperatures. This dehydration may, of course, be accomplished gradually during operation through the agency of the feed mixture, but an initial period of somewhat low conversion may result. Prior to this step, drying temperatures in the catalyst preparation procedure are not usually higher than subsequent initial operating temperatures.

This invention can be more easily understood from the study of the drawing which is a schematic illustration on the process of this invention. Now referring to the drawing, a liquid feed stream comprising mixed $C_4$ hydrocarbons, a large portion of which is butene-1, is fed to reaction 10 through conduit 11. The stream is contacted with the silica gel catalyst within reactor 10 which is maintained in the temperature range from 90–125° F., preferably from 90–100° F., and at a pressure in the range of from 100–900 p.s.i.a., preferably from 100–200 p.s.i.a. The silica gel catalyst comprises from 50 to 99 percent by weight $SiO_2$ and from 1 to 50 percent by weight of an oxide of a metal selected from Groups III–A and IV–B of Periodic Table as referred to above. Ideally, the catalyst should comprise about 88 percent $SiO_2$ and 12 percent $Al_2O_3$. It is preferred that the liquid $C_4$ stream is run through reactor 10 at about 5 to 15 pounds of liquid $C_4$ per pound of catalyst per hour. Ideally, the rate should be from 8–10 pounds of liquid $C_4$ per pound of catalyst per hour. Thus, a major portion of the isobutylene within the liquid $C_4$ stream is polymerized to form dimers and heavier materials.

The resulting stream containing the polymerized material is passed to fractionator 12 via conduit 13. Fractionator 12 is heated by any suitable means known in the art (not shown in the drawing), and refluxed with cooled liquid (not shown). Preferably, fractionator 12 is operated at about 90 p.s.i.a., and a bottom temperature of about 150° F. and a top temperature of about 100° F. Propane, isobutane, and some butene-1 are removed via conduit 14 in a vapor phase. A 99+ percent butene-1 stream is withdrawn via conduit 15. A heavy stream containing polymerized material is withdrawn by conduit 17 and passed to a column polymer fractionator 16.

Polymer fractionator 16 is heated and refluxed in a similar manner as with fractionator 12 and is operated at about 350° F. and 70 p.s.i.a. at the bottom of the column and about 110° F. and 65 p.s.i.a. at the top of the column. A vaporous hydrocarbon stream is withdrawn from polymer fractionator 16 via conduit 19 and polymeric material is withdrawn from polymer fractionator 16 via conduit 18. The vaporous monomeric material from fractionator 16 is cooled by heat exchanger 20 wherein it is substantially condensed and then passed to accumulator 21 and liquid hydrocarbons are then withdrawn via conduit 22. A portion of this liquid stream is recycled at a constant rate as reflux to the upper portion of fractionator 16 via conduit 24 in response to the position of valve 23 which is in turn controlled by the flow through conduit 24. The remainder of stream 22 is removed as a product via conduit 25.

Thus, it is readily seen that the isobutylene within the liquid $C_4$ feed stream is effectively removed therefrom by polymerization and a very pure butene-1 stream is removed via conduit 15 from fractionator 12. This is a very inexpensive process which is carried out at relatively low conditions of temperature and pressure. It must also be noted that the polymers of isobutylene removed via conduit 18 are to a large extent in the form of dimers and can be depolymerized by any method known in the art such as the depolymerization method disclosed in U.S. Patent 2,552,692 to yield relatively pure isobutylene.

The following example is given to illustrate a typical isobutylene extraction operation by the process of this invention and is not intended to unduly limit the scope thereof.

EXAMPLE

The flow of components is illustrated in pounds per hour through various conduits as illustrated in the drawing as shown in the table below. The table also illustrates the temperature and pressure of each of the streams. To yield of the results illustrated in the table below reaction 10 contains approximately 1650 pounds of ⅜-inch in diameter pellets of the silica-gel catalyst. The specific catalyst used is 88 percent $SiO_2$ and 12 percent $Al_2O_3$. It is also noted that butene-1 stream removed via conduit 15 is 99.5+% pure.

TABLE 1.—POUNDS PER HOUR (NET FLOW)[1]

| Component | 11 | 13 | 14 | 15 | 17 | 18 | 25 |
|---|---|---|---|---|---|---|---|
| Propane | 34 | 34 | 34 | | | | |
| Isobutane | 448 | 448 | 448 | | | | |
| Isobutylene | 219 | 11 | 9 | 2 | | | |
| Butene-1 | 12,649 | 11,546 | 100 | 9,346 | 2,100 | 8 | 2,092 |
| Butadiene | 43 | 23 | | | 19 | 4 | 4 |
| n-Butane | 1,045 | 1,045 | | | 10 | 1,035 | 4 | 1,031 |
| Butene-2 | 147 | 1,020 | | | 1 | 1,019 | 4 | 1,015 |
| Polymer | | 458 | | | | 458 | 458 | |
| Total | 14,585 | 14,585 | 591 | 9,378 | 4,616 | 474 | 4,142 |
| Temperature, °F | 100 | 125 | 100 | 100 | 150 | 350 | 100 |
| Pressure, p.s.i.a. | 200 | 100 | 90 | 90 | 90 | 68 | 60 |

[1] Does not include reflux.

An examination of the table will illustrate that over 95 percent of the isobutylene is polymerized in reactor 10 under relatively low conditions of temperatures and pressures. The polymerized products are completely removed from the liquid stream and ultimately passed from the process via conduit 18.

I claim:
1. A process of selectively polymerizing isobutylene from a first liquid hydrocarbon stream containing $C_4$ hydrocarbons including butene-1 comprising;
   contacting said stream at a temperature under 150° F. and a pressure in the range of from 100–200 p.s.i.a. with a silica-gel catalyst promoted by the incorporation of an oxide of a metal selected from groups III–A and IV–B of the Periodic System and forming polymers of isobutylene.
2. The process of claim 1 wherein the temperature of said stream is from 90–125° F., the flow rate of said stream is from 5–15 pounds of said liquid per pound of said catalyst per hour.
3. The process of claim 1 wherein said catalyst comprises from 50 to 99 percent by weight $SiO_2$, and from 1 to 50 percent by weight of said metal oxide.
4. The process of claim 1 wherein said catalyst comprises 88 percent by weight $SiO_2$ and 12 percent by weight $Al_2O_3$.
5. The process of claim 1 further comprising:
   (a) passing said first liquid stream containing said polymer to a first fractionation zone;
   (b) removing a first vaporous stream from the top of the first fractionation zone;
   (c) removing a second liquid stream containing sub- stantially pure butene-1 from the upper region of said first fractionation zone;
(d) removing a third liquid hydrocarbon stream from the bottom of said first fractionation zone;
(e) passing said third liquid hydrocarbon stream to a second fractionation zone;
(f) removing a second vaporous hydrocarbon stream from said second fractionation zone;
(g) removing a second liquid hydrocarbon stream comprising said polymers from said second fractionation zone.

6. Process of claim 5 further comprising condensing substantially all of said second vaporous hydrocarbon stream to form a fourth liquid hydrocarbon stream, and passing at least a portion thereof to said second fractionation zone.

References Cited
UNITED STATES PATENTS

| | | | |
|---|---|---|---|
| 2,552,692 | 5/1951 | Schulze et al. | 260—677 |
| 3,275,707 | 9/1966 | Bauer | 260—683.15 |

DELBERT E. GANTZ, *Primary Examiner.*

J. D. MYERS, *Assistant Examiner.*

U.S. Cl. X.R.

260—683.15